UNITED STATES PATENT OFFICE.

ISAAC M. HARSHBARGER, OF BRANDONVILLE, VIRGINIA.

IMPROVEMENT IN THE MANUFACTURE OF SOAP.

Specification forming part of Letters Patent No. 34,956, dated April 15, 1862.

*To all whom it may concern:*

Be it known that I, ISAAC M. HARSHBARGER, of Brandonville, in the county of Preston and State of Virginia, have invented a new and useful Improvement in the Manufacture of Soap; and I do hereby declare that the following is a full, clear, and exact description of the same.

This invention consists in the employment or use of burnt copperas and gum-ammoniac in about equal quantities in combination with hard white soap, sal-soda, spirits of hartshorn, borax, alcohol, and water in varying proportion for the purpose of producing toilet-soap or washing-soap or for the purpose of doubling the quantity of common lye soft soap.

In the manufacture of toilet-soap the application of the burnt copperas and gum-ammoniac and the proportion of these ingredients in relation of the other ingredients is about as follows: water, one and one-half gallon; hard white soap, known as "Irish mixture," seven pounds; sal-soda, one-fourth pound; spirits of hartshorn, two table-spoonfuls; alcohol, two table-spoonfuls; borax, one tea-spoonful; burnt copperas, one tea-spoonful; gum-ammoniac, one tea-spoonful. These ingredients are all put in a kettle and boiled until well mixed and dissolved. The mass is now scented and colored to suit and poured out to cool, and when cold it is fit for use.

In the manufacture of washing-soap the ingredients are essentially the same, but the proportions are slightly changed. In this case the ingredients are mixed together in the following proportion: water, six gallons; hard white soap, as above, six pounds; sal-soda, two pounds; spirits of hartshorn, six table-spoonfuls; borax, one table-spoonful; gum-ammoniac, one table-spoonful; burnt copperas, one table-spoonful; and the mixture is now treated as above described.

In doubling the quantity of common lye soft soap the proceeding is as follows: Take the following ingredients, viz: common soft soap, one barrel; water, one barrel; sal-soda, six pounds; spirits of hartshorn, six table-spoonfuls; borax, two table-spoonfuls; gum-ammoniac, two table-spoonfuls; burnt copperas, two table-spoonfuls. The sal-soda, borax, gum-ammoniac, and copperas are dissolved in hot water, and the solution is mixed with the other ingredients and well stirred for fifteen minutes, when the compound is fit for use and the quality improved.

By the use of the gum-ammoniac and burnt copperas my compound is made to act medically on the skin, leaving it smooth and supple, and at the same time my soaps are the best detergents yet known. They will exterminate tar without the usual aid, and also all other defilements to which garments may be subjected without injuring the texture. Much labor and time will thus be saved by the use of my soap in washing clothes.

Having thus fully described my invention, what I claim as new, and desire to secure by Letters Patent, is—

The employment or use of gum-ammoniac and burnt copperas when the same are mixed together with borax, spirits of hartshorn, sal-soda, water, and ordinary hard or soft soap, substantially in the manner and for the purpose herein shown and described.

ISAAC M. HARSHBARGER.

Witnesses:
A. C. FREY,
J. H. GIBSON.